US008743897B2

(12) United States Patent
Lee et al.

(10) Patent No.: US 8,743,897 B2
(45) Date of Patent: *Jun. 3, 2014

(54) METHOD AND APPARATUS OF MULTICAST SERVICE FLOW PROCESSING FOR HEADEND CABLE MODEM

(75) Inventors: Ho-Sook Lee, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 95 days.

This patent is subject to a terminal disclaimer.

(21) Appl. No.: 13/149,075

(22) Filed: May 31, 2011

(65) Prior Publication Data
US 2011/0228775 A1 Sep. 22, 2011

Related U.S. Application Data

(62) Division of application No. 12/190,706, filed on Aug. 13, 2008, now Pat. No. 7,974,283.

(30) Foreign Application Priority Data

Dec. 10, 2007 (KR) ........................ 10-2007-0127381

(51) Int. Cl.
*H04H 20/71* (2008.01)
*H04L 12/28* (2006.01)
*H04J 3/26* (2006.01)
(52) U.S. Cl.
USPC .................. 370/432; 370/390; 370/312

(58) Field of Classification Search
None
See application file for complete search history.

(56) References Cited

U.S. PATENT DOCUMENTS

| 5,060,228 | A | * | 10/1991 | Tsutsui et al. ................ 370/402 |
|---|---|---|---|---|
| 6,778,532 | B1 | | 8/2004 | Akahane et al. |
| 6,788,683 | B1 | | 9/2004 | Ikeda et al. |
| 7,161,945 | B1 | * | 1/2007 | Cummings ................... 370/401 |
| 7,388,870 | B2 | * | 6/2008 | Pfeffer et al. ................. 370/401 |
| 7,408,877 | B2 | * | 8/2008 | Chandran et al. ............ 370/230 |
| 7,606,154 | B1 | * | 10/2009 | Lee ................ 370/232 |
| 7,742,406 | B1 | * | 6/2010 | Muppala ....................... 370/230 |
| 2003/0002506 | A1 | | 1/2003 | Moriwaki et al. |
| 2003/0031178 | A1 | * | 2/2003 | Haeri et al. ................... 370/392 |

(Continued)

FOREIGN PATENT DOCUMENTS

KR 1020060068277 A 6/2006
KR 10-0728259 B1 6/2007

OTHER PUBLICATIONS

DOCSIS (Data-Over-Cable Service Interface Specifications DOCSIS 3.0; Revision I05, Published: Aug. 3, 2007 ).*

(Continued)

*Primary Examiner* — Hassan Phillips
*Assistant Examiner* — Hicham Foud
(74) *Attorney, Agent, or Firm* — Ladas & Parry LLP

(57) ABSTRACT

The processing of a multicast service flow for a headend cable modem by classifying an inputted multicast packet by a session composing an internal header including multicast service flow information allocated to the classified session and then outputting an internal multicast packet including the internal header.

9 Claims, 8 Drawing Sheets

(56) References Cited

U.S. PATENT DOCUMENTS

| | | |
|---|---|---|
| 2003/0073453 A1* | 4/2003 | Basilier .................... 455/503 |
| 2005/0078699 A1 | 4/2005 | Cummings |
| 2005/0226144 A1* | 10/2005 | Okita ........................ 370/219 |
| 2006/0120369 A1 | 6/2006 | Chandran et al. |
| 2006/0182118 A1* | 8/2006 | Lam et al. .............. 370/395.42 |
| 2006/0251065 A1* | 11/2006 | Hamamoto et al. ......... 370/389 |
| 2007/0133588 A1 | 6/2007 | Kwon et al. |
| 2007/0153820 A1 | 7/2007 | Gould |
| 2008/0130641 A1* | 6/2008 | Lee et al. .................... 370/389 |
| 2009/0040924 A1* | 2/2009 | Evans ........................ 370/230 |

OTHER PUBLICATIONS

USPTO OA mailed Aug. 20, 2010 in connection with U.S. Appl. No. 12/190,706.

USPTO NOA mailed Mar. 22, 2011 in connection with U.S. Appl. No. 12/190,706.

* cited by examiner

<APPARATUS FOR PROCESSING MULTICAST SERVICE FLOW 200>

INPUT PACKET FORM-1

OUTPUT PACKET FORM-1

OUTPUT PACKET FORM-2

METHOD AND APPARATUS OF MULTICAST SERVICE FLOW PROCESSING FOR HEADEND CABLE MODEM

CROSS-REFERENCE TO RELATED APPLICATION

This application claims priority from Korean Patent Application No. 10-2007-0127381, filed on Dec. 10, 2007, in the Korean Intellectual Property Office, the entire disclosure of which is incorporated herein by reference.

BACKGROUND OF THE INVENTION

1. Field of the Invention

The present invention relates to service flow processing in a network, for example, a Hybrid Fiber Coax (HFC) network, and more particularly, to a method and apparatus of processing a multicast service flow for a headend cable modem in an HFC network using a channel bonding scheme.

This work was supported by the IT R&D program of MIC/IITA [2006-S-019-02, The Development of Digital Cable Transmission and Receive System for 1 Gbps Downstream].

2. Description of Related Art

A Hybrid Fiber Coax (HFC) network is a network including an optical fiber and a coaxial cable, and is a broadband transmission network to transmit a data signal (for the Internet, a cable television (TV), crime prevention, disaster prevention, remote inspection of a meter, and automatic control) using the optical fiber to a broadcasting station and an Optical Network Unit (ONU), and using the coaxial cable from the ONU to subscribers.

Internet Protocol (IP) multicast denotes a point-to-multipoint transmission scheme to transmit a packet to a specific service group, and includes an Any Source Multicast (ASM) scheme of classifying a session by only a receiving group address without identifying a transmitter, and a Source Specific Multicast (SSM) scheme of classifying the session by the transmitter even in the case of the same receiving group address, based on a configuration form of a multicast session.

FIG. 1 illustrates a multicast concept in Data Over Cable Service Interface Specifications (DOCSIS).

Referring to FIG. 1, all multicasts of an ASM scheme and an SSM scheme need to be supported in DOCSIS 3.0 being a standard of a cable network supporting channel bonding.

A headend Cable Modem Termination System (CMTS) 101 attaches a Downstream Service Identification (DSID) to all coming multicast service flows. The CMTS 101 transmits, to cable modems (CMs) 104 and 105, multicast service flows 102 and 103 to which the DSID is attached.

The CMTS 101 following DOCSIS 3.0 assigns the unique DSID to all multicast traffic composing the multicast session, and transmits the multicast service flow 102 to the CM 104, and the CM 104 performs filtering based on the DSID without identifying a group address with respect to the multicast session.

However, according to pre-DOCSIS 3.0, the CM 105 controls whether a multicast packet is transmitted, using a snooping operation of a protocol unit to join in a multicast group and leave from the multicast group.

In DOCSIS 3.0 using a channel bonding scheme, the CMTS 101 needs to classify a service flow so that the CM receiving a packet with respect to a single multicast session may not overlappingly receive the packet of the same multicast session.

A single multicast packet coming from a network service interface to the CMTS 101 may generate at least one multicast service flow based on a physical form (in the cable network) of a receiving group at which the multicast session intends to arrive.

Accordingly, a multicast packet processor (not shown) located in a Media Access Control (MAC) layer of the CMTS 101 needs to identify the multicast session corresponding to the multicast packet, identify the multicast service flow allocated to the identified session, compose an internal information header included in the inputted packet based on related information of the service flow, copy a plurality of multicast data packets, and transmit the plurality of multicast data packets to the CM.

SUMMARY OF THE INVENTION

An aspect of the present invention provides a method and apparatus for classifying a downstream multicast packet inputted from a network service interface to a Cable Modem Termination System (CMTS) by a multicast session, classifying service flows corresponding to the classified multicast session, and composing information about a corresponding service flow as an internal header.

Another aspect of the present invention also provides a method and apparatus for copying a multicast packet the same number of times as a number of service flows when at least one multicast service flow allocated to the classified session exists, composing a downstream service identifier related to a corresponding service flow and related service flow information as an internal header in the copied packet.

Another aspect of the present invention also provides a data structure for classifying a multicast packet by a multicast session, classifying service flows corresponding to the classified multicast session, and composing information about a corresponding service flow as an internal header.

According to an aspect of the present invention, there is provided a method of processing a multicast service flow in a CMTS, the method including: classifying an inputted multicast packet by a session; composing an internal header including multicast service flow information allocated to the classified session; and outputting an internal multicast packet including the internal header.

According to another aspect of the present invention, there is provided a method of processing a multicast service flow in a CMTS, the method including: verifying whether an inputted downstream data packet corresponds to a multicast packet, using a destination address of the inputted downstream data packet; searching to verify whether multicast session information exists when the inputted downstream data packet corresponds to the multicast packet; composing an internal header including multicast service flow information allocated to a session when the multicast session information about the inputted downstream data packet exists; and outputting the multicast packet including the composed internal header.

According to still another aspect of the present invention, there is provided an apparatus for processing a multicast service flow in a CMTS, the apparatus including: a multicast packet processor to classify an inputted multicast packet by a session, to add an internal header to the multicast packet, the internal header including multicast service flow information allocated to the classified session, and to output the multicast packet; and a header processor to compose a multicast MAC packet based on the internal header, to perform downstream scheduling of the multicast packet using the same scheme as a general service flow, and to transmit the MAC packet to a downstream physical layer.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
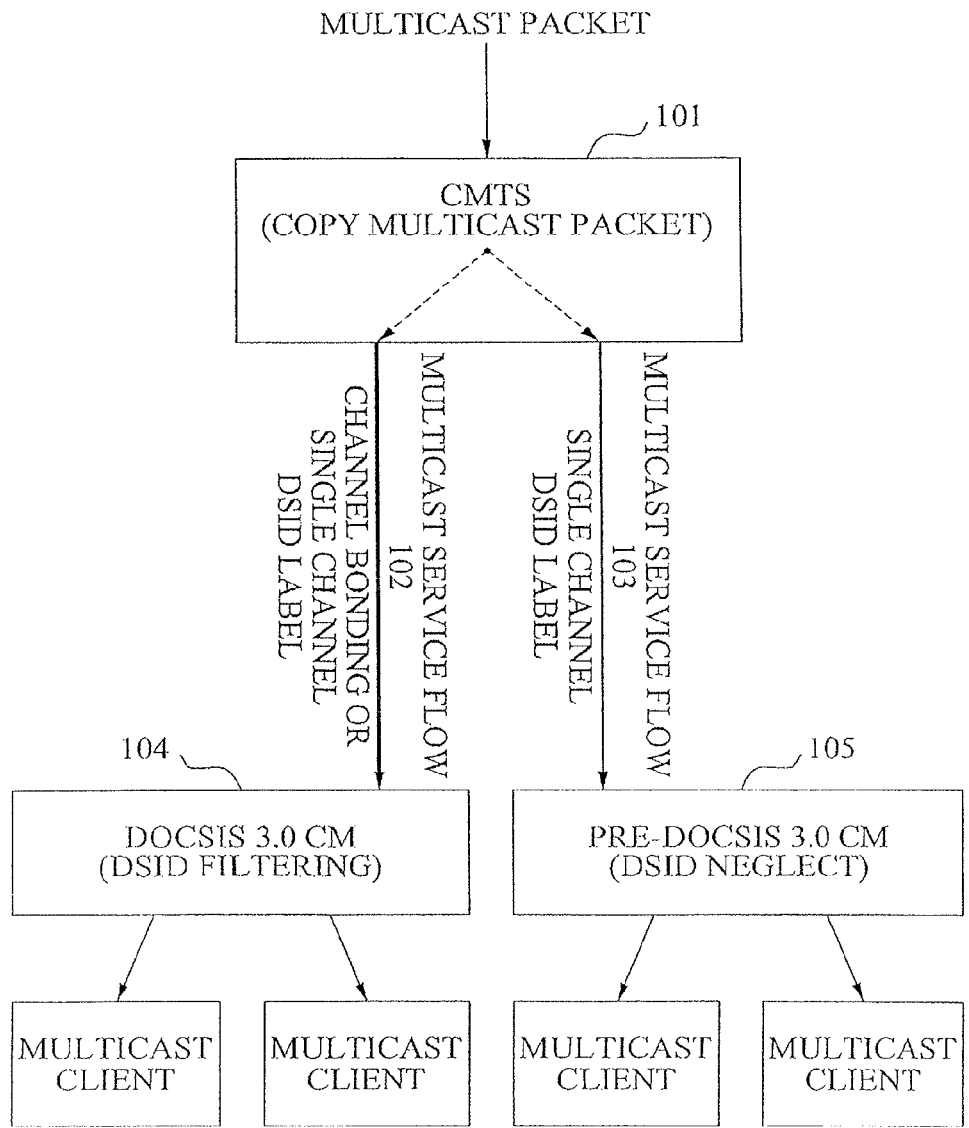
FIG. 1 illustrates a multicast concept in Data Over Cable Service Interface Specifications (DOCSIS)

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

Figure 2:
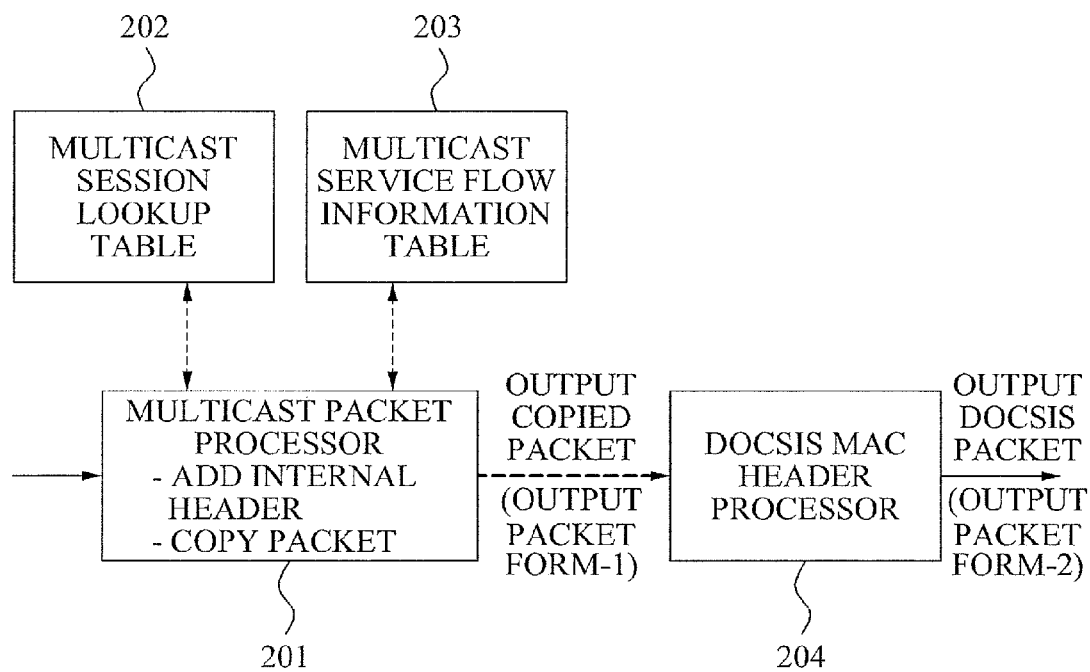
FIG. 2 is a block diagram illustrating a configuration of an apparatus for processing a multicast service flow according to an exemplary embodiment of the present invention.

FIG. 2 is a block diagram illustrating a configuration of an apparatus 200 for processing a multicast service flow according to an exemplary embodiment of the present invention.

Referring to FIG. 2, the apparatus 200 for processing the multicast service flow includes a multicast packet processor 201 and a header processor (a Data Over Cable Service Interface Specifications Media Access Control (DOCSIS MAC) header processor) 204.

The multicast packet processor 201 classifies an inputted multicast packet by a session, adds an internal header to the multicast packet, the internal header including multicast service flow information allocated to the classified session, and outputs the multicast packet.

Figure 3A:
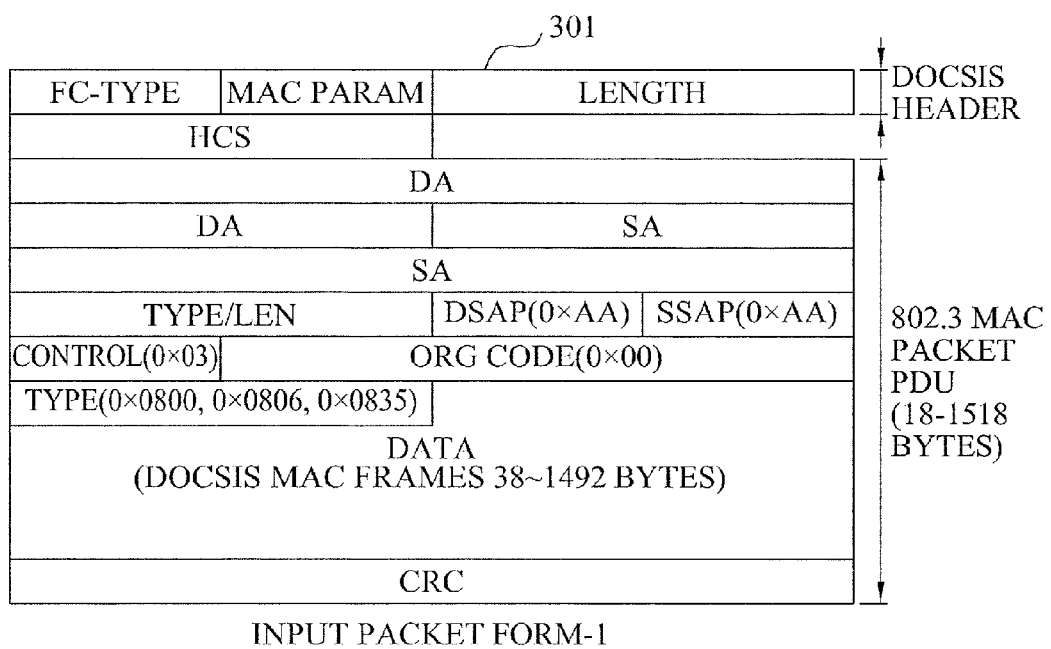
FIGS. 3A through 3C illustrate input/output packet configurations according to an exemplary embodiment of the present invention.
Figure 3B:
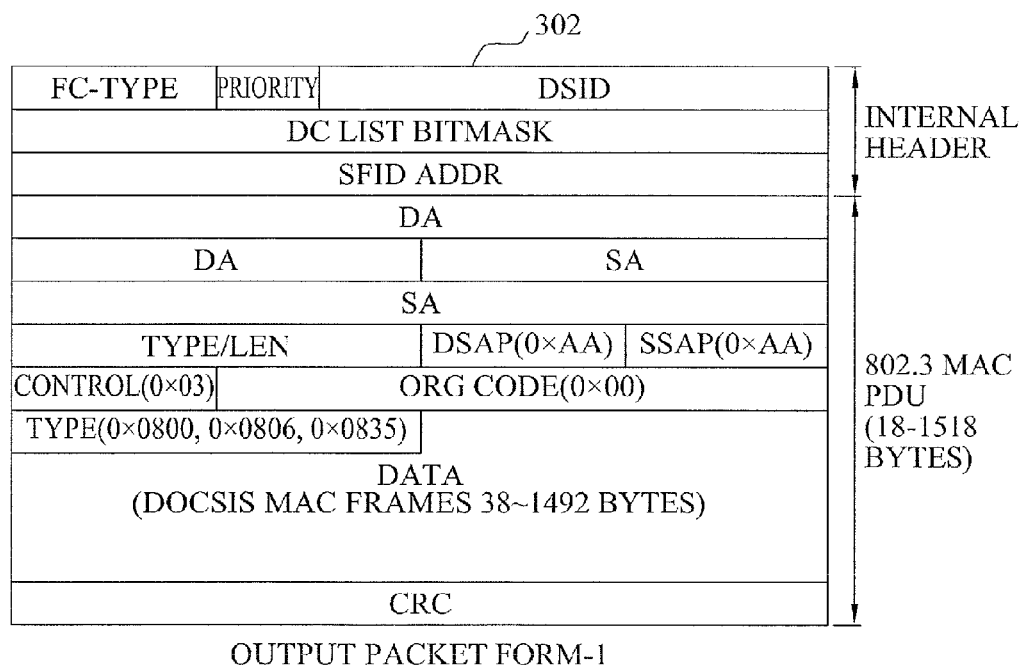

An input packet configuration 301 of the multicast packet processor 201 is illustrated in FIG. 3A. An output packet configuration 302 of the multicast packet processor 201 is illustrated in FIG. 3B.

The multicast packet processor 201 acquires service flow information related to the inputted multicast packet, copies the multicast packet necessary multiple times, adds the internal header to each multicast packet, and outputs the multicast packet.

The multicast packet processor 201 searches for an address of a service flow information table from a multicast lookup table including service flow address information corresponding to the classified multicast session, and extracts internal header information including downstream service identifier information from the service flow information table and composes the internal header.

The header processor 204 composes a multicast MAC packet based on the internal header, performs downstream scheduling of the multicast packet using the same scheme as a general service flow, and transmits the MAC packet to a downstream physical layer.

Figure 3C:
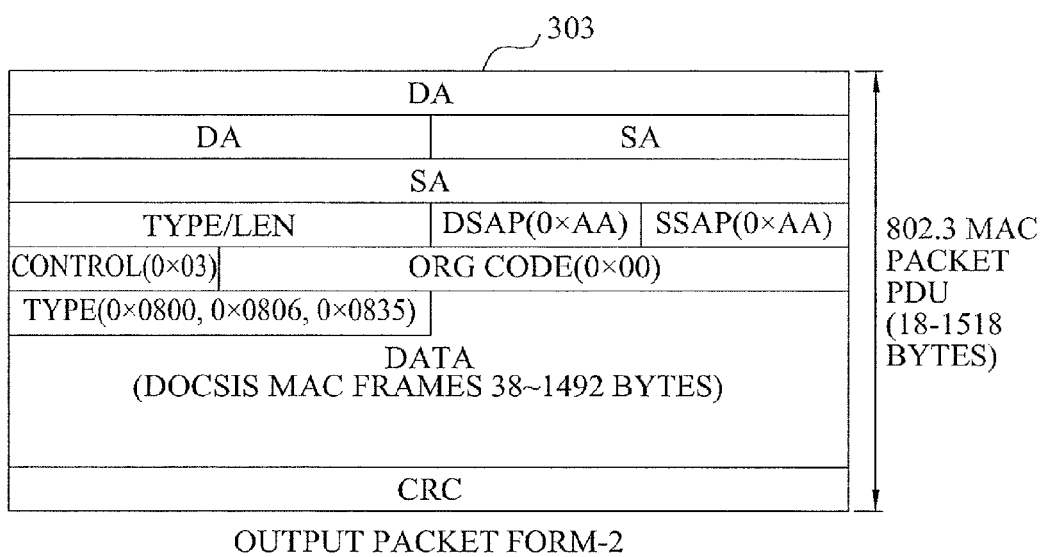

The header processor 204 generates a DOCSIS MAC packet in an output packet configuration 303 of FIG. 3C regardless of a service flow type based on internal header information of a predetermined form, and transmits the DOCSIS MAC packet to a cable modem (CM) using a downstream physical layer interface. Since the multicast service flow outputted by the multicast packet processor 201 used for an exemplary embodiment of the present invention is reflected on downstream channel transmission scheduling through the same packet transmission process as a general unicast service flow and a broadcast service flow without passing through a separate header processing process, independent modularity with respect to a transmission processing process of the multicast service flow may be secured.

The output packet configuration 303 of the header processor 204 is illustrated in FIG. 3C.

The apparatus 200 for processing the multicast service flow may include a multicast session lookup table 202 to be composed to search for the address of the service flow information table using a receiving group address of the inputted multicast packet and a transmission address as a search character string.

According to another exemplary embodiment of the present invention, the multicast session lookup table 202 may be included the multicast packet processor 201.

The apparatus 200 for processing the multicast service flow may include a multicast service flow information table 203 to include at least one of information concerning whether a channel bonding service of the multicast packet is provided, transmission priority information, a downstream channel list, a downstream service flow identifier, and a subsequent link address of a service flow connected with a linked list.

According to another exemplary embodiment of the present invention, the multicast service flow information table 203 may be included the multicast packet processor 201.

The multicast packet processor 201 refers to the multicast session lookup table 202 and the multicast service flow information table 203 in order to acquire the service flow information related to the inputted multicast packet.

Figure 4:
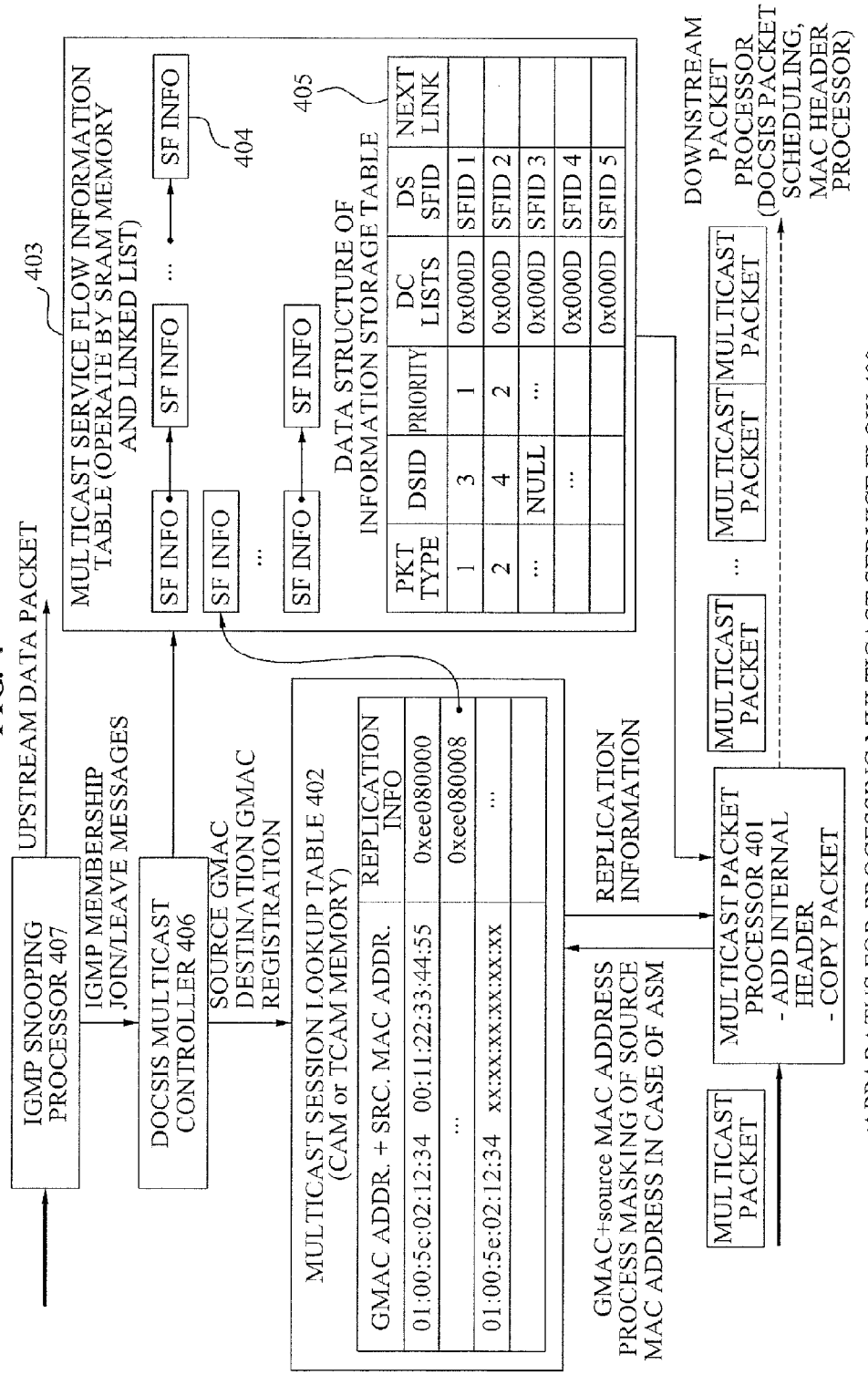
FIG. 4 is a block diagram illustrating a configuration of an apparatus for processing a multicast service flow according to another exemplary embodiment of the present invention.

FIG. 4 is a block diagram illustrating a configuration of an apparatus 400 for processing a multicast service flow according to another exemplary embodiment of the present invention.

Referring to FIG. 4, the apparatus 400 for processing the multicast service flow includes a multicast packet processor 401, a multicast session lookup table 402, a multicast service flow information table 403, a multicast controller (a DOCSIS multicast controller) 406, and an Internet Group Management Protocol (IGMP) snooping processor 407.

The multicast packet processor 401 performs the same function as the multicast packet processor 201 of FIG. 2.

According to an exemplary embodiment of the present invention, the multicast session lookup table 402 may be composed by a cyclic access memory (CAM) search scheme or a ternary content addressable memory (TCAM) search scheme.

According to an exemplary embodiment of the present invention, a data structure of the multicast session lookup table 402 is formed to search for an address of a service flow information table with respect to a corresponding multicast session using an Ethernet MAC address denoting a receiving group address of an inputted multicast packet (hereinafter, referred to as a GMAC address), and an Ethernet MAC address denoting a transmission address (hereinafter, referred to as an SMAC address) as a search character string.

The multicast service flow information table 403 may include a static random access memory (SRAM), and include a linked list 404 of a service flow and an information storage table 405.

Accordingly, service flows allocated to a session by setting an address field acquired from session information of the multicast session lookup table 402 as a start entry are connected with the linked list 404.

A single multicast session may generate at least one service flow, and information about each service flow entry may include fields such as the information storage table 405.

Referring to the information storage table 405, the information about each service flow entry includes at least one of a packet (Pkt) type field denoting a type of a DOCSIS MAC header of the multicast packet to be transmitted, header configuration information, and whether a channel bonding service is provided, a Downstream Service Identification (DSID) field, a transmission priority field to be applied to downstream packet transmission scheduling, a Downstream Channel (DC) list field to be available when supporting a channel bonding function, a Downstream Service Flow Identification (DS SFID) field, and a next link field denoting an address of a subsequent connected link.

The information included in each field of the information storage table 405 is referred for scheduling and a header processing process of a downstream packet processor in which header processing with respect to a DOCSIS MAC packet and downstream transmission scheduling are performed.

As illustrated in FIG. 3B, the information included in each field of the information storage table 405 is applied to an internal header field to be added to a front portion of the inputted multicast packet.

The multicast controller 406 generates the multicast service flow with respect to the multicast session collected by the IGMP snooping processor 407 for an upstream packet or operator specific information, and composes multicast session information.

A control function performed by the multicast controller 406 is a flexible control function to be composed by a hardware or software function, and includes a management function to generate and delete a downstream multicast session and the service flow.

Hereinafter, referring to the accompanying drawings, specific operations of the multicast packet processors 201 and 401 are described.

Figure 5:
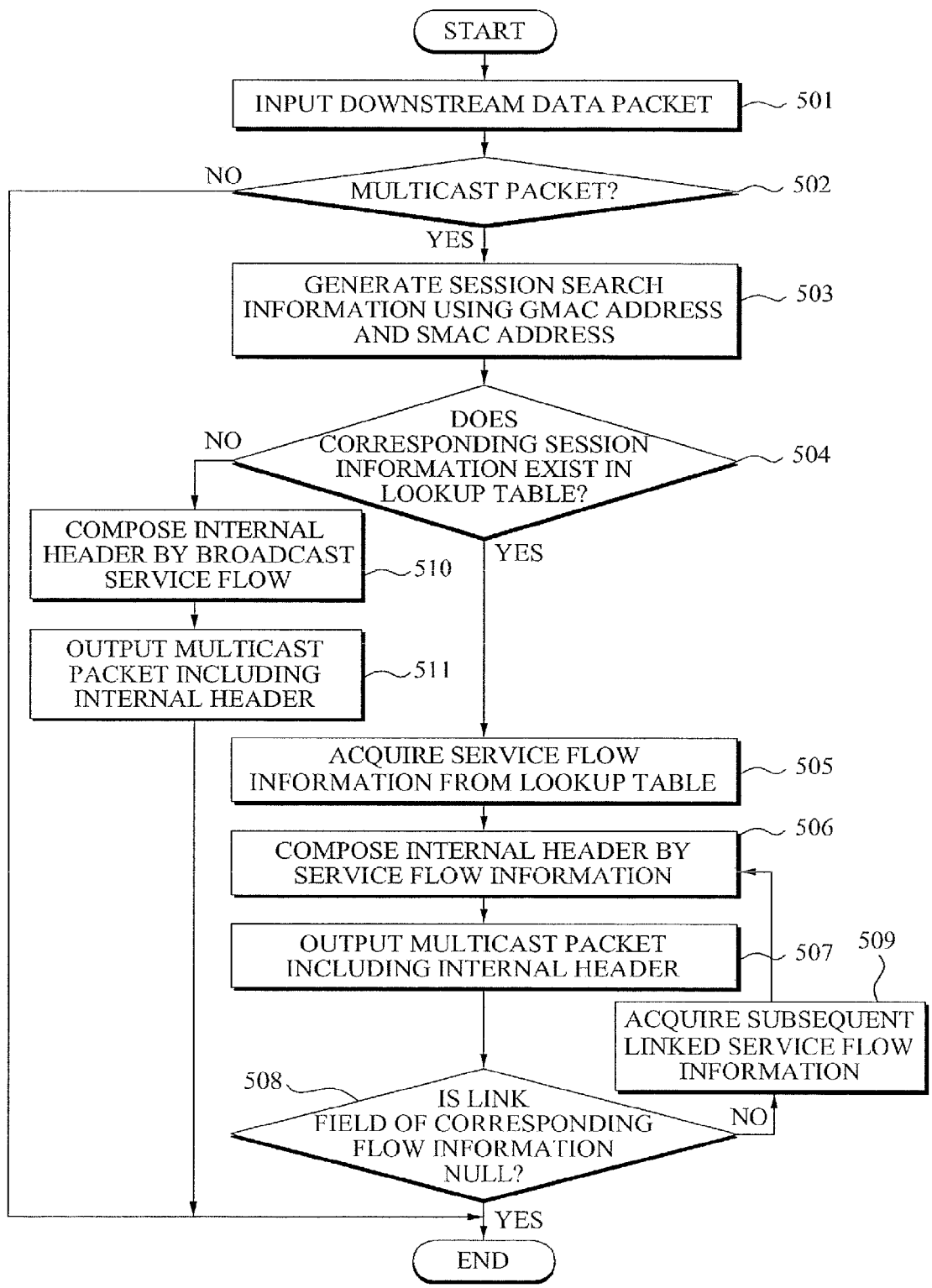
FIG. 5 is a flowchart illustrating a method of processing a multicast service flow according to an exemplary embodiment of the present invention.

FIG. 5 is a flowchart illustrating a method of processing a multicast service flow according to an exemplary embodiment of the present invention.

Referring to FIG. 5, the method of processing the multicast service flow includes verifying whether an inputted downstream data packet corresponds to a multicast packet, using a destination address of the inputted downstream data packet in operations 501 and 502, searching to verify whether multicast session information exists when the inputted downstream data packet corresponds to the multicast packet in operations 503 and 504, composing an internal header including multicast service flow information allocated to a session when the multicast session information about the inputted downstream data packet exists in operations 505 and 506, and outputting the multicast packet including the composed internal header in operation 507.

In operations 501 and 502, when a data packet is inputted, the multicast packet processors 201 and 401 determine whether a start address corresponds to a multicast group address (ex: 01:00:5e start) using an Ethernet MAC destination address.

In operation 503, when the start address of the Ethernet MAC destination address corresponds to the multicast group address, the multicast packet processors 201 and 401 compose a multicast session search character string using a GMAC address and an SMAC address.

In operation 504, the multicast packet processors 201 and 401 search for the multicast session lookup tables 202 and 402 and determine whether corresponding session information exists.

In operation 505, when the corresponding session information exists in the multicast session lookup tables 202 and 402, the multicast packet processors 201 and 401 acquire the start address of the multicast service flow information.

In operation 506, the multicast packet processors 201 and 401 search for service flow information using the start address of the acquired service flow information, and compose the internal header in a front portion of the inputted multicast packet by the retrieved information.

In operation 507, the multicast packet processors 201 and 401 output an internal multicast packet including the composed internal header.

According to an exemplary embodiment of the present invention, at least one service flow with respect to a single session may exist.

Accordingly, the multicast packet processors 201 and 401 read subsequent link information of the retrieved service flow information and determine whether subsequent linked service flow information exists in operation 508, acquire corresponding information when the linked service flow exists, in operation 509, and repeat operations 506 and 507.

The multicast packet processors 201 and 401 finally repeat operations 506 and 507 until the subsequent link information of the retrieved service flow information is null in operation 508.

In operation 502, the multicast packet processors 201 and 401 directly output general packets excluding the multicast packet to a downstream packet processor.

In operation 510, the multicast packet processors 201 and 401 deal with packets which include a multicast Ethernet MAC address and in which a multicast session is not retrieved in the multicast session lookup table in operation 504, as the service flow for broadcast.

In operation 510, the multicast packet processors 201 and 401 compose the internal header including information denoting a broadcast service flow. In operation 511, the multicast packet processors 201 and 401 output the internal multicast packet including the internal header. This is for transmitting the corresponding multicast packet using a downstream channel by which the service flow for broadcast is transmitted since searching for a downstream channel group with respect to the session to transmit the corresponding multicast service flow fails.

Figure 6:
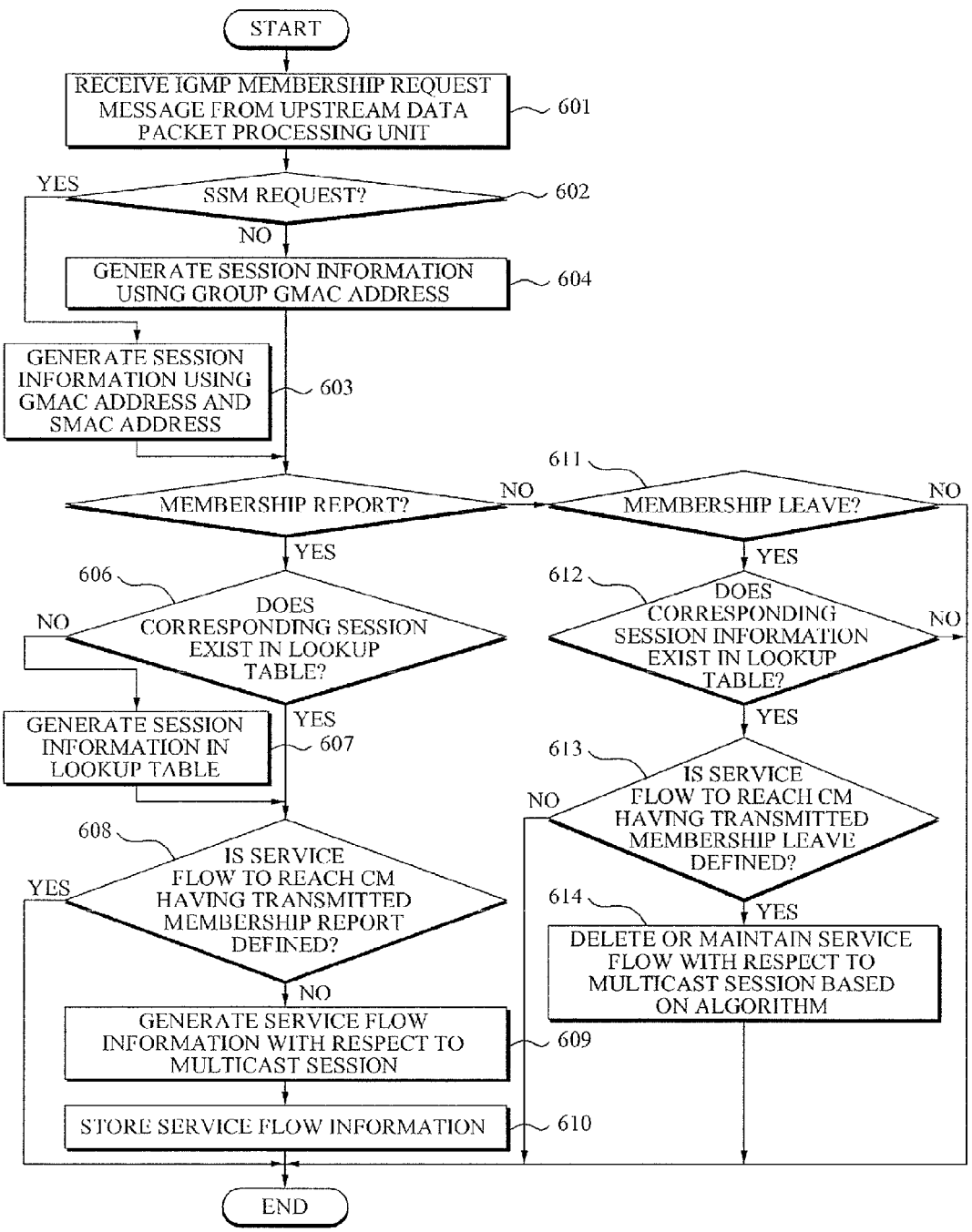
FIG. 6 is a flowchart illustrating an operation of a multicast controller according to an exemplary embodiment of the present invention.

FIG. 6 is a flowchart illustrating an operation of the multicast controller 406 according to an exemplary embodiment of the present invention.

Referring to FIG. 6, a control function of the multicast controller 406 includes receiving a multicast membership request message and generating session information in operations 601 through 604, determining whether the generated session information exists in a lookup table when the multicast membership request message corresponds to a message of requesting group joining in operations 605 and 606, searching to verify whether service flow information corresponding to the session information exists when the session information exists in the lookup table in operations 608, and generating and storing the service flow information when the service flow information corresponding to the session information does not exist in operations 609 and 610.

In operation 601, the multicast controller 406 receives a message to request multicast group joining or leaving (the multicast membership request message) using the IGMP snooping processor 407 in an upstream data packet processor (not shown), a presetting function of an operator, and the like.

In operation 602, the multicast controller 406 determines whether the received multicast membership request message corresponds to a Source Specific Multicast (SSM) scheme of identifying a transmission area address.

In operation 603, when the received multicast membership request message corresponds to the SSM scheme, the multicast controller 406 adds a GMAC address and an SMAC address and generates the session information.

In operation 604, when the received multicast membership request message is different from the SSM scheme, the multicast controller 406 processes masking of the SMAC address on the GMAC address and generates the session information.

In operation 605, the multicast controller 406 determines whether a membership request performed by the received multicast membership request message corresponds to a report message of requesting group joining.

In operation 606, when the membership request corresponds to the report message, the multicast controller 406 searches to verify whether a corresponding session exists in the multicast session lookup tables 202 and 402.

In operation 607, when the corresponding session does not exist in the multicast session lookup tables 202 and 402, the multicast controller 406 generates multicast session information and records the multicast session information in the multicast session lookup tables 202 and 402.

In operation 608, the multicast controller 406 searches to verify whether the service flow information about the corresponding multicast session information exists in the multicast service flow information tables 203 and 403.

The service flow information about the multicast session information denotes a service flow to reach a CM having transmitted a membership report.

In operations 609 and 610, when the service flow information about the corresponding multicast session information does not exist, the multicast controller 406 generates the service flow information and records the service flow information in the multicast service flow information tables 203 and 403.

In operation 611, when the membership request is different from the report message based on the determining in operation 605, the multicast controller 406 determines whether the membership request corresponds to a leave message of requesting membership leave. When the membership request corresponds to the leave message, the multicast controller 406 determines whether the corresponding session information exists in the multicast session lookup tables 202 and 402.

When the corresponding session information is retrieved in operation 611, the multicast controller 406 searches for the service flow information corresponding to the session information in operation 613, and deletes or maintains the service flow based on a service flow processing algorithm or changes information in operation 614.

In operation 612, the multicast controller 406 does not perform a particular operation with respect to a message excluding a membership joining request and a membership leave request.

An algorithm requested for generating or deleting the multicast service flow with respect to a multicast session in the multicast controller 406 may compose an optimized algorithm based on a logical topology of a MAC domain in a cable network, a DOCSIS version incompatibility of CMs, and the like. However, a configuration of the algorithm requested for generating or deleting the multicast service flow is excluded from the range of the present invention and any well-known technology may be used.

The method of processing the multicast service flow according to the above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, a Cable Modem Termination System (CMTS) may classify a multicast session and a multicast service flow using an efficient scheme with respect to a multicast packet coming from a network, and transmit a packet outputted by a multicast processing result to a CM through the same downstream scheduling as a different service flow and a MAC header processing process in a MAC layer of the CMTS without separate additional processing.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of processing a downstream scheduling of a multicast service flow in a Cable Modem Termination System (CMTS), the method comprising:
   receiving a multicast packet;
   determining whether a start address of an inputted downstream data packet corresponds to a multicast group address of the received multicast packet using an ethernet MAC destination address of the inputted downstream data packet;
   composing a multicast session search character string using an ethernet MAC address denoting a receiving group address of the inputted downstream data packet (GMAC address) and an ethernet MAC address denoting a transmission address (SMAC address);
   searching multicast session lookup tables to verify whether multicast session information exists;

acquiring the start address of a multicast service flow information;

searching for service flow information using the start address of the acquired service flow information;

composing an internal header in a front portion of the inputted downstream data packet comprising multicast service flow information allocated to a session when the multicast session information about the inputted downstream data packet exists; and composing a multicast MAC packet based on the internal header; and outputting the received multicast MAC packet comprising the composed internal header.

2. The method of claim 1, wherein, when the multicast session information about the inputted downstream data packet does not exist, the internal header comprising information denoting a broadcast service flow is composed.

3. The method of claim 1, wherein the internal header comprises at least one of information concerning whether a channel bonding service of the multicast packet is provided, transmission priority information, a downstream channel list, a downstream service flow identifier, and a subsequent link address of a service flow connected with a linked list.

4. The method of claim 1, wherein after the CMTS receives the multicast packet, the received multicast packet is output having either a first downstream service flow identifier or a second downstream service flow identifier.

5. The method of claim 1 wherein the multicast MAC packet performs downstream scheduling of the multicast packet using the same scheme as a general service flow and a broadcast service flow.

6. The method of claim 5 further comprising transmitting the multicast MAC packet to a downstream physical layer.

7. The method of claim 1 further comprising:
   determining whether subsequent linked service flow information exists; and
   acquiring corresponding information when the linked service flow exists.

8. A method of processing a downstream scheduling of a multicast service flow in a Cable Modem Termination System (CMTS), the method comprising:
   receiving a multicast packet;
   verifying whether an inputted downstream data packet corresponds to the received multicast packet using a destination address of the inputted downstream data packet;
   composing a multicast session search character string using an ethernet MAC address denoting a receiving group address of the inputted downstream data packet (GMAC address) and an ethernet MAC address denoting a transmission address (SMAC address);
   searching multicast session lookup tables to verify whether multicast session information exists when the inputted downstream data packet corresponds to the received multicast packet;
   acquiring the start address of a multicast service flow information;
   searching for service flow information using the start address of the acquired service flow information;
   composing an internal header comprising multicast service flow information allocated to a session when the multicast session information about the inputted downstream data packet exists; and
   outputting the received multicast packet comprising the composed internal header, and
   wherein after the CMTS receives the multicast packet, the received multicast packet is output having either a first downstream service flow identifier or a second downstream service flow identifier, and
   wherein the first downstream service flow identifier comprise at least one of channel bonding and single channel, and
   wherein the second downstream service flow identifier comprise only single channel.

9. A method of processing a multicast service flow in a Cable Modem Termination System (CMTS), the method comprising:
   receiving a multicast packet;
   determining whether a start address of an inputted downstream data packet corresponds to a multicast group address of the received multicast packet using an ethernet MAC destination address of the inputted downstream data packet;
   composing a multicast session search character string using an ethernet MAC address denoting a receiving group address of the inputted downstream data packet (GMAC address) and an ethernet MAC address denoting a transmission address (SMAC address);
   searching multicast session lookup tables to verify whether multicast session information exists when the inputted downstream data packet corresponds to the received multicast packet;
   composing an internal header including information denoting a broadcast service flow when the multicast session information about the inputted downstream data packet does not exist; and
   outputting the received multicast packet comprising the composed internal header.

* * * * *